(12) United States Patent
Abe

(10) Patent No.: US 8,026,046 B2
(45) Date of Patent: *Sep. 27, 2011

(54) METHOD FOR PRODUCING MULTI-LAYER OPTICAL DISK

(75) Inventor: Shinya Abe, Kadoma (JP)

(73) Assignee: Panasonic Corporation, Osaka (JP)

( * ) Notice: Subject to any disclaimer, the term of this patent is extended or adjusted under 35 U.S.C. 154(b) by 474 days.

This patent is subject to a terminal disclaimer.

(21) Appl. No.: 11/935,130

(22) Filed: Nov. 5, 2007

(65) Prior Publication Data

US 2008/0233520 A1 Sep. 25, 2008

Related U.S. Application Data

(62) Division of application No. 10/398,092, filed as application No. PCT/JP01/08477 on Sep. 27, 2001, now Pat. No. 7,315,508.

(30) Foreign Application Priority Data

Oct. 3, 2000 (JP) .................................. 2000-303347
Jul. 25, 2001 (JP) .................................. 2001-225008

(51) Int. Cl.
*G11B 7/24* (2006.01)
*G03F 7/20* (2006.01)

(52) U.S. Cl. ..................................... 430/321; 369/275.4

(58) Field of Classification Search .......................... None
See application file for complete search history.

(56) References Cited

U.S. PATENT DOCUMENTS

| | | | |
|---|---|---|---|
| 4,325,135 A | | 4/1982 | Dil et al. |
| 4,655,876 A * | | 4/1987 | Kawai et al. .................. 216/48 |
| 4,729,940 A * | | 3/1988 | Nee et al. .................. 205/655 |
| 4,964,958 A * | | 10/1990 | Legierse et al. .................. 205/68 |
| 5,023,856 A * | | 6/1991 | Raaymakers et al. ...... 369/47.37 |
| 5,191,564 A | | 3/1993 | Hosokawa |
| 5,255,262 A | | 10/1993 | Best et al. |
| 5,297,129 A * | | 3/1994 | Wilkinson et al. ......... 369/59.12 |
| 5,381,401 A * | | 1/1995 | Best et al. .................. 369/275.1 |
| 5,702,792 A * | | 12/1997 | Iida et al. .................... 428/64.1 |
| 5,703,792 A * | | 12/1997 | Chapman ........................ 506/24 |
| 5,757,756 A * | | 5/1998 | Hajjar ........................ 369/275.1 |

(Continued)

FOREIGN PATENT DOCUMENTS

EP 0517490 A2 12/1992

(Continued)

OTHER PUBLICATIONS

Nikkei Electronics; No. 76, pp. 51-52, May 21, 2001.

(Continued)

*Primary Examiner* — Martin Angebranndt

(74) *Attorney, Agent, or Firm* — Panitch Schwarze Belisario & Nadel LLP

(57) ABSTRACT

A method for producing a multilayer optical disk including a plurality of information storage layers is disclosed. The method includes a mastering step of preparing a plurality of metal dies, a replicating step of producing a base plate onto which a desired pattern is transferred using the plurality of metal dies and forming recordable/reproducible information storage layers. The desired pattern includes a wobbling tract pattern that is formed by combining a plurality of wobble patterns each having the same fundamental frequency. The mastering step produces the plurality of metal dies for the plurality of information storage layers having a shape that specifies a track groove whose shape factor differs from one information storage layer to another.

9 Claims, 11 Drawing Sheets

U.S. PATENT DOCUMENTS

| | | | |
|---|---|---|---|
| 5,764,619 A | 6/1998 | Nishiuchi et al. | |
| 5,972,459 A | 10/1999 | Kawakubo et al. | |
| 6,046,968 A | 4/2000 | Abramovitch et al. | |
| 6,064,644 A | 5/2000 | Miyamoto et al. | |
| 6,154,440 A * | 11/2000 | Ichihara | 369/275.4 |
| 6,160,776 A | 12/2000 | Seo | |
| 6,233,219 B1 | 5/2001 | Hori et al. | |
| 6,246,656 B1 | 6/2001 | Kawakubo et al. | |
| 6,256,282 B1 * | 7/2001 | Yamagami et al. | 369/111 |
| 6,577,590 B2 * | 6/2003 | Minamino et al. | 369/275.3 |
| 6,608,810 B2 * | 8/2003 | Minamino et al. | 369/275.4 |
| 6,674,700 B2 * | 1/2004 | Minamino et al. | 369/47.22 |
| 6,714,508 B1 | 3/2004 | Spruit et al. | |
| 6,724,708 B2 * | 4/2004 | Ishibashi et al. | 369/59.25 |
| 6,757,239 B2 * | 6/2004 | Minamino et al. | 369/275.4 |
| 6,842,420 B2 | 1/2005 | Tsukuda et al. | |
| 6,856,589 B2 | 2/2005 | Hirotsune et al. | |
| 6,865,146 B2 | 3/2005 | Kojima | |
| 6,990,055 B1 | 1/2006 | Nakamura et al. | |
| 7,027,374 B2 * | 4/2006 | Minamino et al. | 369/53.34 |
| 7,075,883 B2 * | 7/2006 | Minamino et al. | 369/275.3 |
| 7,116,624 B2 * | 10/2006 | Nakamura et al. | 369/59.25 |
| 7,145,843 B2 * | 12/2006 | Minamino et al. | 369/44.13 |
| 7,315,508 B2 * | 1/2008 | Abe | 369/275.4 |
| 7,362,664 B2 * | 4/2008 | Ishibashi et al. | 369/30.01 |
| 2001/0012265 A1 | 8/2001 | Nishiyama et al. | |
| 2004/0027943 A1 | 2/2004 | Furumiya et al. | |
| 2007/0081432 A1 * | 4/2007 | Minamino et al. | 369/44.13 |

FOREIGN PATENT DOCUMENTS

| | | | |
|---|---|---|---|
| EP | 0838808 A2 | | 4/1998 |
| EP | 1308939 A1 | | 5/2003 |
| JP | 59-218646 | * | 12/1984 |
| JP | 61-210541 | * | 9/1986 |
| JP | 63-007536 | * | 1/1988 |
| JP | 03-176841 | * | 7/1991 |
| JP | 09-054986 A | | 2/1997 |
| JP | 11-039657 A | | 2/1999 |
| JP | 11-120617 A | | 4/1999 |
| JP | 2000-268409 A1 | | 9/2000 |
| WO | 0045381 A1 | | 8/2000 |
| WO | 02/19332 | * | 3/2002 |

OTHER PUBLICATIONS

Proposed Techniques to Make Next-Generation Optical Discs—Roughly Established and Now Entering the Second State, Nikkei Electronics, May 21, 2001, 796, pp. 49-56.

\* cited by examiner

METHOD FOR PRODUCING MULTI-LAYER OPTICAL DISK

CROSS-REFERENCE TO RELATED APPLICATIONS

This application is a divisional of U.S. patent application Ser. No.: 10/398,092, filed April 2, 2003, now U.S. Pat. No. 7,315,508, which is a Section 371 of International Application No. PCT/JP01/08477, filed Sep. 27, 2001, the disclosure of which is incorporated herein by reference.

BACKGROUND OF THE INVENTION

The present invention relates to an optical storage medium such as an optical disk and a method for producing the optical storage medium, and more particularly, to a multilayer optical disk comprising a plurality of information storage layers with guide grooves (track grooves).

With the widespread use of compact disks (CD), the optical disk has won a position of an important storage medium. Readable/writable disks, such as CD-R and CD-RW disks, which can not only reproduce but also record information is also widely used. Research and development of optical disks of higher density is at full blast in recent years.

In increasing the recording density of an optical disk, not only increasing the recording density of one information storage layer but also increasing the number of information storage layers is effective. In DVD family, there is a read-only optical disk that allows information recorded on two information storage layers to be read from one side. In addition to the read-only optical disk having two information storage layers, a readable/writable optical disk having two information storage layers is also under development.

With reference to FIG. 1, a configuration of a readable/writable optical disk having two information storage layers will be explained.

The readable/writable optical disk shown in FIG. 1 has two information storage layers made of a phase change material whose optical characteristic changes between amorphous and crystalline phases. On each information storage layer, an amorphous pattern called "mark" is recorded by irradiation with a laser beam.

The optical disk in FIG. 1 comprises a first substantially transparent substrate 201 having a track groove (groove) and a second substantially transparent substrate 205 having a track groove which are bonded to each other. A semi-transparent first information storage layer 202 is formed on the first substantially transparent substrate 201, and a second information storage layer 204 is formed on the second substantially transparent substrate 205. Both substrates 201 and 205 are placed in such a way that the two information storage layers 202 and 203 face each other, and are bonded to each other by means of a substantially transparent bonding layer 203. The bonding layer 203 functions as an intermediate layer that separates the first information storage layer 202 from the second information storage layer 203.

The track grooves of the respective information storage layers 202 and 204 wobbles at a predetermined frequency. When information is recorded/reproduced, a readout signal having the frequency is detected and a clock signal is generated. The clock signal is used to adjust the rotation speed of the disk with the read/write speed of the disk apparatus.

In such a multilayer optical disk, compared to the amount of light incident from the optical head of the disk apparatus upon the optical disk, the amount of light that returns from each information storage layer to the photo-detection area of the optical head is quite small. This causes the readout signal obtained from the wobbling of the track grooves on the respective storage layers to become small.

Furthermore, since the structure of the recording film (light transmittance and reflectance, etc.) differs from one information storage layer to another, the ratio of the amplitude of a readout signal to the noise level of the readout signal (CN ratio: Carrier to Noise Ratio) may vary considerably among a plurality of information storage layers. In this case, it is difficult to reproduce the clock signal accurately based on the wobbling shapes of the track grooves of the respective information storage layers.

It is an object of the present invention to provide a multilayer optical disk capable of reliably reproducing a clock signal based on wobbling shapes of track grooves of respective information storage layers.

BRIEF SUMMARY OF THE INVENTION

The multilayer optical disk according to the present invention is a multilayer optical disk including a plurality of information storage layers to/from which information is recorded and/or reproduced by an optical head, wherein the plurality of information storage layers are stacked through intermediate layers, each information storage layer includes a wobbling track groove, and shape factors of the track groove of at least one information storage layer of the plurality of information storage layers are different from the shape factors of track grooves of other information storage layers.

In a preferable embodiment, the shape factors of the track groove include a wobbling amplitude of the track groove along the radial direction of the disk, a depth of the track groove and/or a slope angle of the side wall of the track groove.

In another preferable embodiment, a different value is given to any one of the shape factors of the track groove for each information storage layer and the amplitude of a readout signal caused by the wobbling of the track groove is thereby adjusted.

In a further preferable embodiment, the shape factors of the track groove are adjusted in such a way that the CN ratios related to the amplitudes of the readout signals caused by the wobbling of the track grooves of the plurality of information storage layers have substantially the same values and variations in the CN ratios are adjusted to within 30% among the information storage layers.

In a further preferable embodiment, the wobbling of the track groove contains a basic frequency component, which oscillates in almost single cycle used for reproduction of a clock signal.

In a further preferable embodiment, the wobbling of the track groove exhibits a shape that varies according to sub-information and contains a higher frequency component than the basic frequency component.

In a further preferable embodiment, the sub-information contains positional information indicating addresses on the disk.

In a further preferable embodiment, the wobbling shape of the track groove includes a combination of a sine wave and/or generally rectangular waveform.

In a further preferable embodiment, the wobbling amplitude of the rectangular waveform is set to be greater than the wobbling amplitude of the sine wave.

The method for producing a multilayer optical disk according to the present invention is a method for producing a multilayer optical disk including a plurality of information storage layers comprising a mastering step of preparing a plurality of metal dies and a replicating step of producing a substrate onto which a desired pattern is transferred using the plurality of metal dies and forming recordable/reproducible information storage layers, wherein in the mastering step, a plurality of metal dies for the plurality of information storage layers having a shape that specifies a track groove whose at least one shape factor differs from one information storage layer to another are produced.

In a preferable embodiment, the mastering step includes a step of preparing a plurality of substrates to which a photosensitive material is applied, a recording step of forming a latent image of a pattern including the wobbling track groove by irradiating a selected area of the photosensitive material with recording light, a developing step of producing a plurality of master disks having the above-described pattern by developing the photosensitive material, and a step of producing a plurality of metal dies based on the plurality of master disks, wherein in the recording step, the amount of deflection of the recording light along the radial direction of the disk is changed for each substrate and the amplitude of wobbling of the track groove is thereby changed for each information storage layer.

In a preferable embodiment, the mastering step includes a step of preparing a plurality of substrates to which a photosensitive material is applied, a recording step of forming a latent image of a pattern including the wobbling track groove by irradiating a selected area of the photosensitive material with recording light, a developing step of producing a plurality of master disks having the above-described pattern by developing the photosensitive material, and a step of producing a plurality of metal dies based on the plurality of master disks, wherein in the recording step, the thickness of photosensitive material is changed for each of the plurality of metal dies.

In a preferable embodiment, the mastering step includes a step of preparing a plurality of substrates to which a photosensitive material is applied, a recording step of forming a latent image of a pattern including the wobbling track groove by irradiating a selected area of the photosensitive material with recording light, a developing step of producing a plurality of master disks having the above-described pattern by developing the photosensitive material, and a step of producing the plurality of metal dies based on the plurality of master disks, wherein the slope angle of the side wall of the track groove is changed for each of the plurality of metal dies.

In a preferable embodiment, the slope angle of the side wall of the track groove is changed by applying heating processing to the master disk after the developing step.

In a preferable embodiment, the slope angle of the side wall of the track groove is changed by applying plasma processing to the metal die after the mastering step and before the replicating step.

In a preferable embodiment, argon and/or oxygen is used for the plasma processing.

In a preferable embodiment, the recording light is deflected according to a pattern combining a sine waveform and rectangular waveform in the recording step.

In a preferable embodiment, the amount of deflection of the recording light is changed between the sine waveform section and the rectangular waveform section.

BRIEF DESCRIPTION OF THE SEVERAL VIEWS OF THE DRAWINGS

In the drawings:

FIG. 14($b$) is plan view illustrating 4 types of wobble patterns formed by combining the above-described elements;

DETAILED DESCRIPTION OF THE INVENTION

The multilayer optical disk according to the present invention can accurately reproduce a signal based on the wobbling of a track groove by changing shape parameters (shape factors) of the track groove for each information storage layer.

With reference now to the attached drawings, a configuration of a track groove of the optical disk will be explained in detail below.

Figure 2:
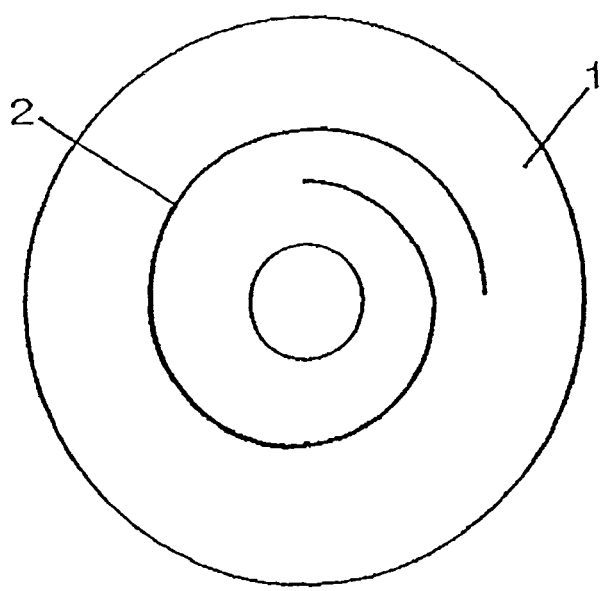
FIG. 2 is a schematic view illustrating a track groove of a multilayer optical disk according to the present invention.
Figure 3:
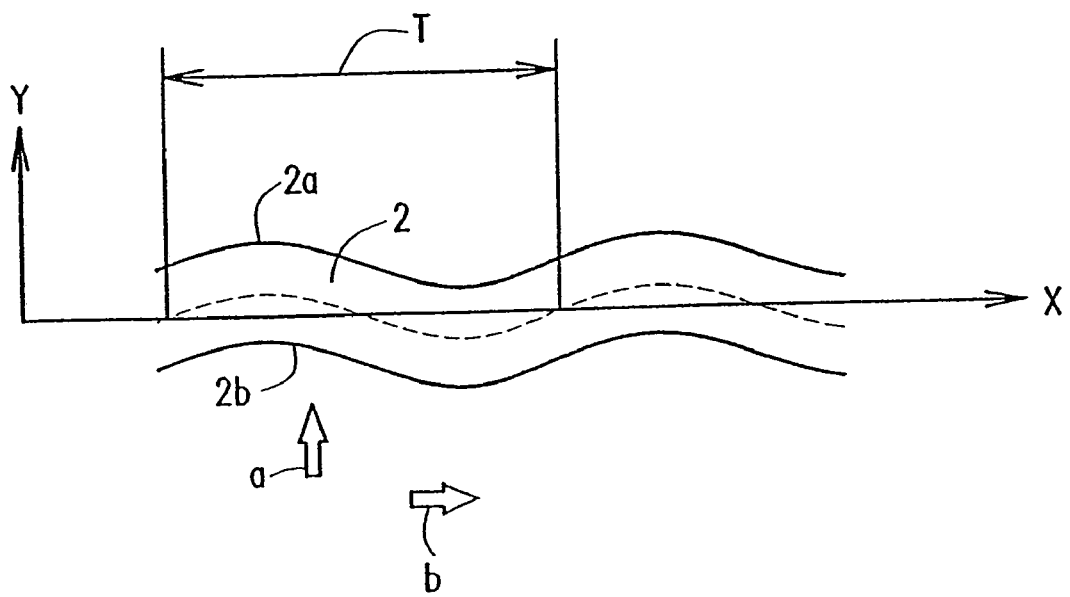
FIG. 3 illustrates details of the above-described track groove.

On a recording plane 1 of the optical disk medium according to the present invention, a track groove 2 is formed in a spiral shape as shown in FIG. 2. FIG. 3 shows an enlarged view of part of the track groove 2. In FIG. 3, a disk center (not shown) exists below the track groove 2 and a disk radial direction is indicated by the arrow a. The arrow b points a direction in which a read/write light beam spot, being formed on the disk, moves as the disk is rotated. In the following description, a direction parallel to the arrow a will be herein referred to as a "disk radial direction" (or "radial direction" simply), while a direction parallel to the arrow b will be herein referred to as a "tracking direction".

In a coordinate system in which the light beam spot is supposed to be formed at a fixed position on the disk, a part of the disk irradiated with the light beam (which will be herein referred to as a "disk irradiated part") moves in the direction opposite to the arrow b.

Hereinafter, the X-Y coordinate system illustrated in FIG. 3 will be considered. In an optical disk according to the present invention, the Y coordinate of a position on a side face 2a or 2b of the track groove changes periodically as the X coordinate thereof increases. Such a periodic positional displacement on the groove side face 2a or 2b will be herein referred to as the "wobble" or "wobbling" of the track groove 2. A displacement in the direction pointed by the arrow a will be herein referred to as a "radially-outwardly displacement", while a displacement in the direction opposite to the arrow a will be herein referred to as a "radially-inwardly displacement". Also, in the Figure, one wobble period is identified by "T". The wobble frequency is inversely proportional to one wobble period T and is proportional to the linear velocity of the light beam spot on the disk.

In the illustrated example, the width of the track groove 2 is constant in the tracking direction (as indicated by the arrow b). Accordingly, the amount to which a position on the side face 2a or 2b of the track groove 2 is displaced in the disk radial direction (as indicated by the arrow a) is equal to the amount to which a corresponding position on the centerline of the track groove 2 (as indicated by the dashed line) is displaced in the disk radial direction. For this reason, the displacement of a position on the side face of the track groove in the disk radial direction will be herein simply referred to as the "displacement of the track groove" or the "wobble of the track groove". It should be noted, however, that the present invention is not limited to this particular situation where the centerline and the side faces 2a and 2b of the track groove 2 wobble to the same amount in the disk radial direction. Alternatively, the width of the track groove 2 may change in the tracking direction. Or the centerline of the track groove 2 may not wobble but only the side faces of the track groove may wobble.

The optical disk of the present invention comprises a plurality of information storage layers and the above-described wobbling track groove is formed on each information storage layer. A main feature of the multilayer disk of the present invention is that shape factors of a track groove are not uniform but different from one information storage layer to another.

Hereunder, embodiments in which three types of shape parameters of a track groove are adjusted will be explained more specifically.

Embodiment 1

First, with reference to FIGS. 4 and 5, a first embodiment of the optical disk of the present invention will be explained.

Figure 4:
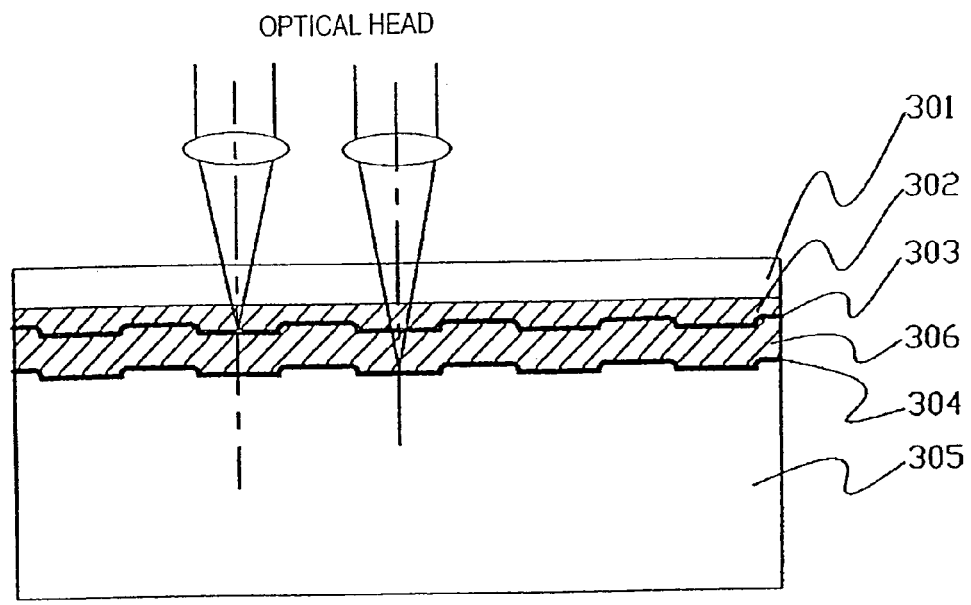
FIG. 4 is a cross-sectional view showing a structure of a first embodiment of a multilayer optical disk according to the present invention.

As shown in FIG. 4, the multilayer optical disk according to this embodiment is a multilayer optical disk including a plurality of information storage layers to/from which information is recorded and/or reproduced by an optical head. The plurality of information storage layers are stacked through intermediate layers and each information storage layer has a surface with a wobbling track groove and a storage layer. FIG. 5 shows how track grooves wobble. The width of the track groove is approximately 0.10 to 0.25 µm and the depth is approximately 10 to 25 nm.

FIG. 4 will be referenced again. More specifically, the optical disk of this embodiment comprises a polycarbonate sheet (80 µm thick) 301, a first UV cure resin layer (10 µm thick) 302, a first semitransparent information storage layer (10 µm thick) 303, a second UV cure resin layer (20 to 40 µm thick) 306, a second information storage layer 304 and a polycarbonate substrate 305, in the order from the side on which the optical head is placed.

The first UV cure resin layer 302 has track grooves with approximately 0.32 µm track pitches and pits formed in the inner area. Pit locations represent non-rewritable information.

Both the first information storage layer 303 and second information storage layer 304 contain a phase change recording materials mainly composed of GeTeSb.

The second UV cure resin layer 306 bonds the first information storage layer 303 and second information storage layer 304, and also functions as an intermediate layer that separates the two information storage layers.

On a first plane of the polycarbonate substrate 305, track grooves with approximately 0.32 µm pitches are formed spirally or concentrically and non-rewritable pits are provided in the inner area of the disk.

Recording/reproduction of the second information storage layer 304 by irradiation with a laser beam is conducted through the first information storage layer 303. Thus, the first information storage layer 303 has a transmittance of approximately 50% with respect to the laser beam used for recording/reproduction.

The various feature sizes such as thickness of each layer, width and depth of each track groove do not reflect their actual sizes. For example, the depth of the track groove is no more than a fraction of a wavelength of the laser beam used for recording/reproduction, while the thickness of the second UV cure resin layer 306 (that is, distance between the upper and lower information storage layers) ranges from several tens of times to even 100 times the above-described wavelength.

A feature of the optical disk of this embodiment is that the amplitude of wobbling of a track groove of the first information storage layer 303 is different from the amplitude of wobbling of a track groove of the second information storage layer 304. This point will be explained in more detail below.

Figure 5:
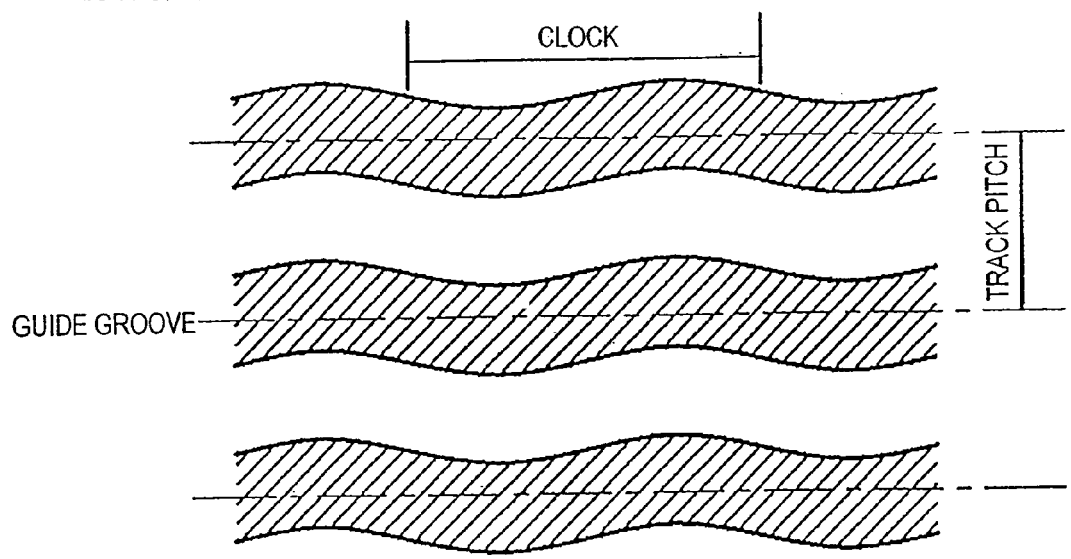
FIG. 5 is a plan view illustrating wobbling patterns of track grooves of the first embodiment.

The track grooves of the respective information storage layers 303 and 304 wobbles in an almost sine waveform at a single frequency as shown in FIG. 5. A frequency of a clock signal is defined based on this frequency. That is, the wobbling frequency of a track groove represents clock information. Here, the "amplitude of wobbling" of the track groove refers to the amplitude of wobbling measured along the disk radial direction.

The above-described clock information is reproduced by the optical head with a numerical aperture of 0.85, which emits a laser beam with a wavelength of 405 nm. More specifically, the laser beam reflected from the optical disk is detected by a photo-detection area divided into two portions to the right and left with respect to the track direction to produce a difference between the two signals (push-pull signal). This push-pull signal is used to control an optical pickup in such a way that a laser beam spot keeps track of the track groove. The push-pull signal includes a frequency component that follows the wobbling of the track groove, but the frequency band of the wobbling is higher than the frequency band of the signal component, which is important in tracking control. Thus, applying appropriate filtering to the push-pull signal makes it possible to separate/detect the clock information. It is possible to provide a portion where the track groove breaks at some region of the track groove to record information other than the clock information in that portion.

Figure 6:
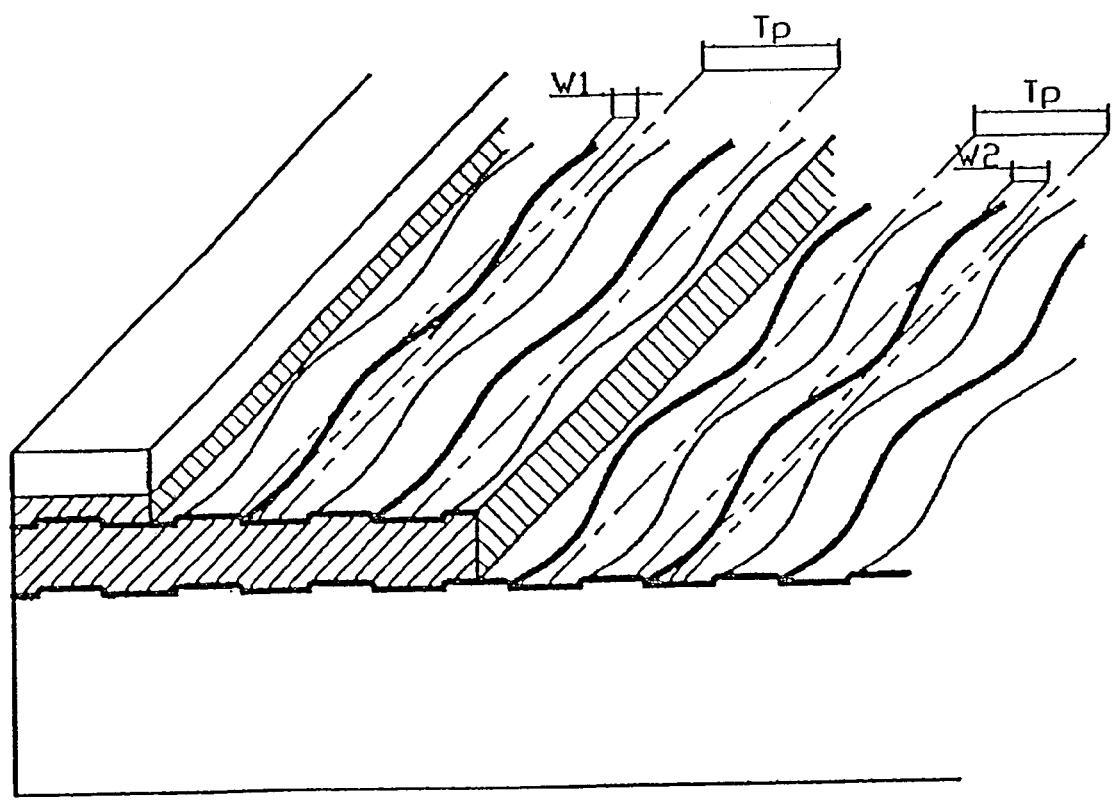
FIG. 6 is a perspective view illustrating wobbling patterns of the track groove of the first embodiment.

In this embodiment, as shown in FIG. 6, the two information storage layers have identical pitches of track grooves (track pitches), but the amplitude of wobbling W1 of the track groove of the first information storage layer 303 and the amplitude of wobbling W2 of the track groove of the second information storage layer 304 are different.

As a comparative example, assuming that the amounts of wobbling of the respective information storage layers W1 and W2 are equivalent to approximately 4% of the pitch of the track groove, the ratio of the intensity of the reflected light which is reflected by the first information storage layer 303 and detected by the photo-detection area of the optical head to the intensity of the laser light incident from the optical head was approximately 7%, while the ratio of the intensity of the reflected light which is reflected by the second information storage layer 304 and detected by the photo-detection area of the optical head was approximately 5%.

Furthermore, when data in the second information storage layer 304 is recorded/reproduced, since the first information storage layer 303 exists in the path of the laser beam, an optical signal reflected by the second information storage layer 304 includes noise caused by the presence of the first information storage layer 303.

Thus, when the intensity of the reflected light from the second information storage layer 304 decreases and noise increases, the CN ratio of the reproduced signal decreases. Furthermore, reading the clock information based on the wobbling of the track groove satisfactorily requires a CN ratio of 30 dB or more. A relationship between the amplitude of wobbling of the track groove W and the CN ratio is shown in Table 1.

TABLE 1

|  | Amount of wobbling 10 nm | Amount of wobbling 15 nm |
|---|---|---|
| 1st information storage layer (W1) | 33 dB | — |
| 2nd information storage layer (W2) | 28 dB | 33 dB |

As is appreciated from Table 1, when both the amplitude of wobbling of the track groove W2 of the second information storage layer 304 and the amplitude of wobbling of wobbling of the track groove W1 of the first information storage layer 303 were equally set to 10 nm, the CN ratio of the signal reproduced from the second information storage layer 304 fell below 30 dB. However, when the amplitude of wobbling W1 was set to 10 nm and the amplitude of wobbling W2 was set to 15 nm, the CN ratio of 33 dB was obtained for the signals reproduced from both information storage layers.

If there is a considerable difference in the amount of light reflected by the respective information storage layers and detected by the photo-detection area of the optical head depending on the information storage layers, a problem occurs when the focal point of the optical head is moved between the two information storage layers when reading/writing data to/from different information storage layers. To avoid this problem, it is desirable to adjust the amount of the detected light in such a way that the amount of light with respect to the information storage layer where the amount of the detected light reaches a maximum is not more than twice the amount of the light with respect to the information storage layer where the amount of the detected light reaches a minimum.

It is preferable to adjust a variation in the CN ratio with respect to the amplitude of the reproduced signal caused by the wobbling of the track groove to within 30% between the information storage layers.

Figure 7:
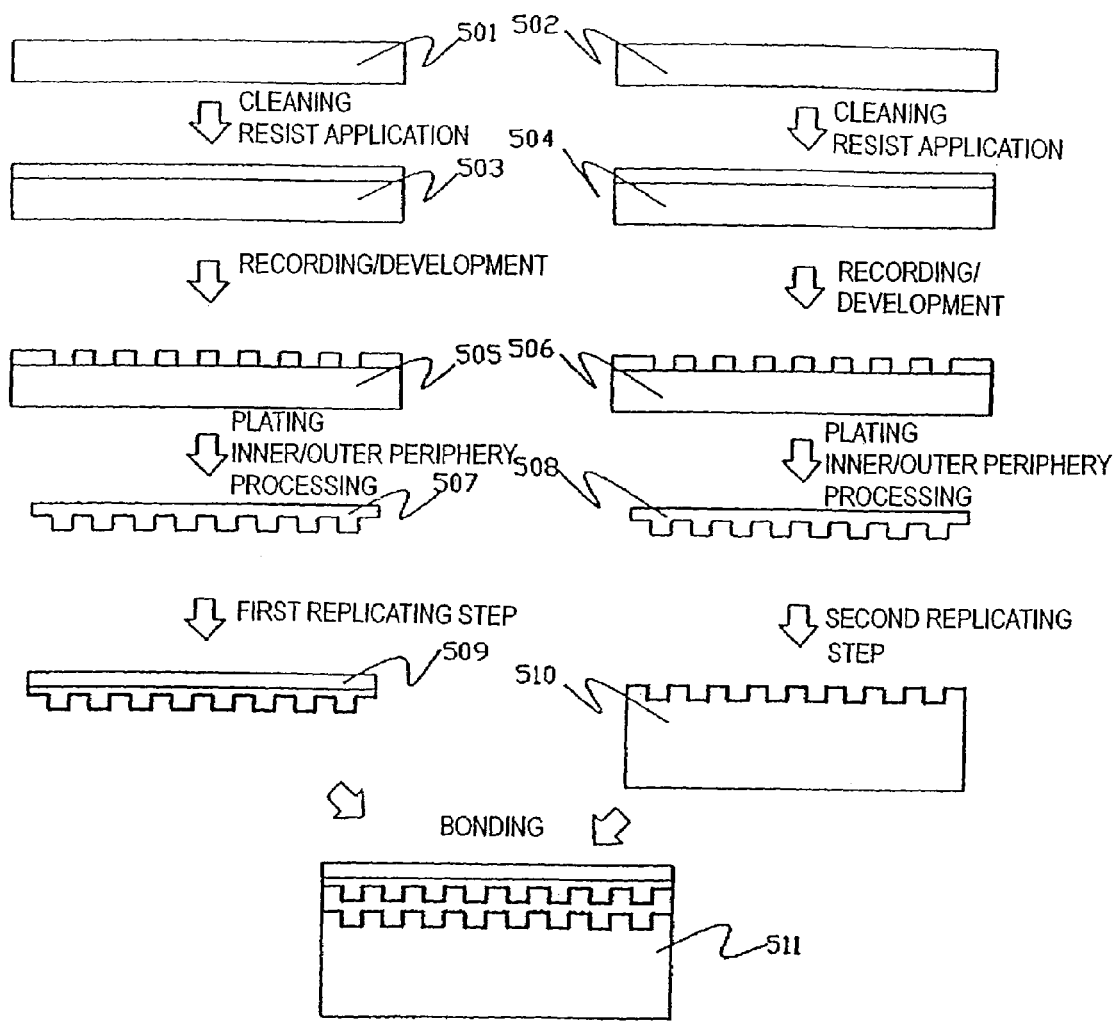
FIG. 7 is a process sectional view illustrating a method for producing the multilayer optical disk according to the first embodiment.

Then, the method of producing the multilayer optical disk of this embodiment will be explained with reference to FIG. 7.

First, a first glass substrate (thickness: for example, approximately 6 mm) 501 and a second glass substrate (thickness: for example, approximately 6 mm) 502 are cleaned. Then, a first master disk 503 with a photoresist (thickness: approximately 10 to 40 mm) applied onto the first glass substrate 501 and a second master disk 504 with a photoresist (thickness: approximately 10 to 40 mm) applied onto the second glass substrate 502 are prepared. The photoresists formed on the glass substrates 501 and 502 have substantially the same thickness.

Then, recording/developing steps of transferring predetermined patterns to the two master disks 503 and 504 are conducted. More specifically, a laser beam with a wavelength of 248 nm is focused on the photoresist for exposure. While rotating the master disks 503 and 504, the position of the beam spot of the laser light on the photoresist is displaced in a radial direction of the disk. This periodical displacement is produced by deflecting the laser beam. In this way, a pattern of a wobbling track groove is transferred to the photoresist. By the way, modulating the intensity of the laser beam makes it possible not only to stop the formation of the track groove but also to control a physical shape such as the width of the track groove. Thus, a desired pattern including the track groove is transferred to the photoresist as a latent image. Then, the predetermined pattern is given to the photoresist after development and a first master disk 505 and second master disk 506 are produced.

A Ni thin film is deposited on the master disks 505 and 506 using a sputtering method. Then, Ni electroforming is performed using the Ni thin film as an electrode and a Ni layer of approximately 300 μm in thickness is formed. After removing the Ni layer from the master disks 505 and 506, the photoresist adhered to the Ni layer is removed and the back of the Ni layer is polished. Unnecessary parts that define the inner diameter and outer diameter of the disk are punched out from this Ni layer and a first stamper 507 and a second stamper 508 that function as metal dies of the optical disk are produced (mastering step).

Figure 8:
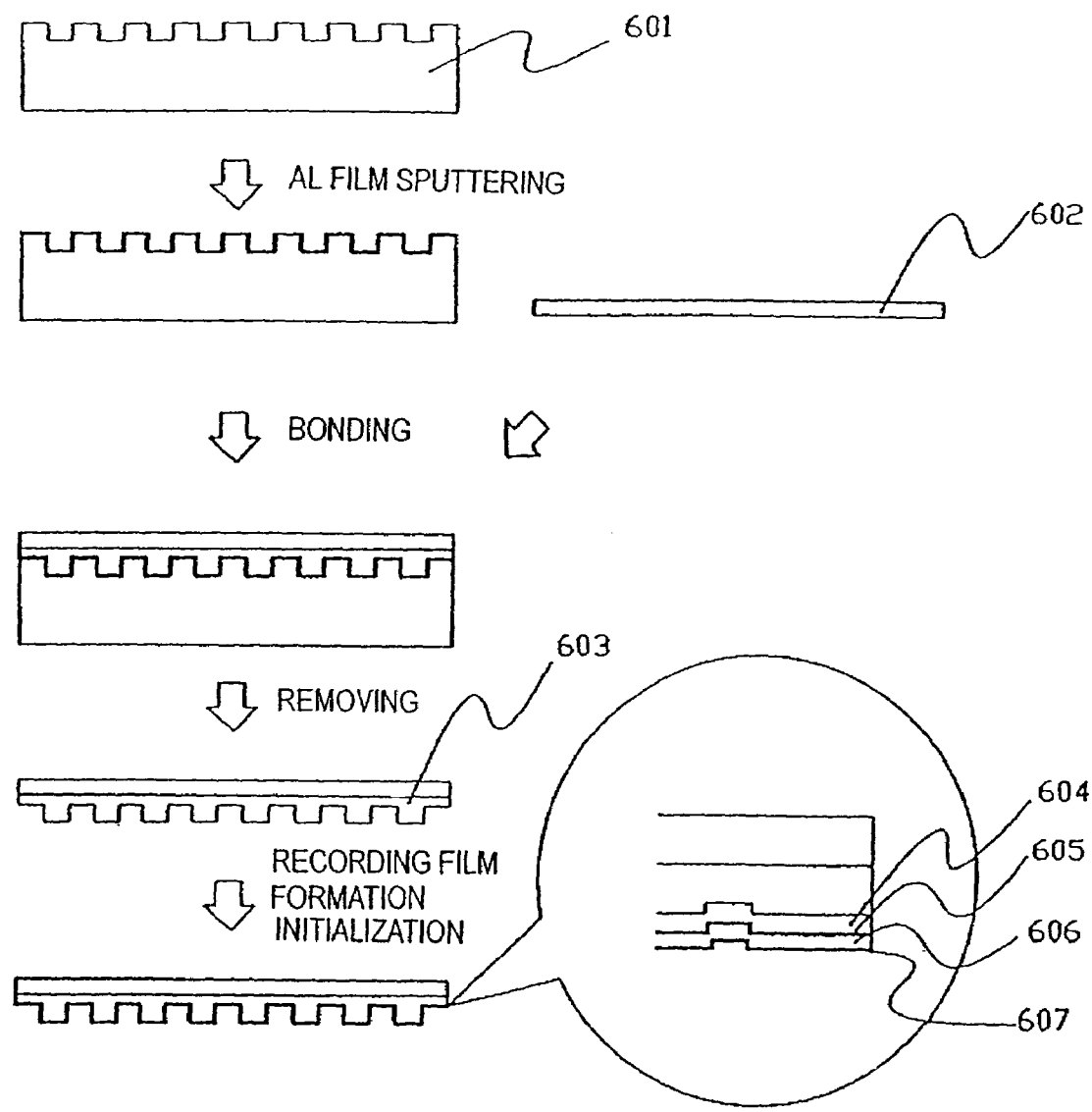
FIG. 8 is a process sectional view illustrating a first replicating step according to the first embodiment.

Then, a first substrate 509 on which a first information storage layer is formed is produced using the first stamper 507. This step (first replicating step) will be explained with reference to FIG. 8.

First, a polycarbonate substrate master 601 will be produced by injection molding using the first stamper 507. A concavo-convex pattern of the first stamper 507 is transferred to the surface of the substrate master 601. An aluminum film is deposited on the pattern transferred surface of the substrate master 601 using the sputtering method.

On the other hand, a circular sheet 602 made of a polycarbonate sheet of approximately 80 μm in thickness is prepared and UV cure resin is discharged onto this circular sheet 602 in a doughnut shape.

Then, the circular sheet 602 is laid on the substrate master 601 with the surface on which the aluminum film is formed facing the circular sheet 602. By rotating the substrate master 601, the extra UV cure resin is removed by a centrifugal force. Thus, the thickness of the UV cure resin between the substrate master 601 and the sheet 602 is adjusted to approximately 10 μm.

After hardening the UV cure resin by irradiation with ultraviolet rays, the hardened UV cure resin and the sheet 602 are removed from the substrate master 601. The UV cure resin and the sheet film 602 are bonded to constitute a sheet substrate 603. On the surface of this sheet substrate 603, the pattern of the first stamper 507 is transferred.

On the pattern transferred surface of the sheet substrate 603, a first dielectric film (thickness: approximately 50 to 1000 nm) 604, a recording film (thickness: approximately 3 to 50 nm) 605, a second dielectric film (thickness: approximately 50 to 1000 nm) 606 and a metal reflecting film (thickness: approximately 0 to 40 nm) 607 are stacked in that order. The metal reflecting film 607 can be omitted. Both the first dielectric film 604 and second dielectric film 606 are made of a material predominantly composed of ZnS and the recording film 605 is formed of a phase change recording material predominantly composed of GeTeSb. The metal reflecting film 607 is made of an Ag alloy film and has a thickness, which makes it semi-transparent to the laser beam used for recording/reproduction. All the layers that constitute this multilayer (information recording film) are preferably deposited using a sputtering method.

The recording film 605 formed using the sputtering method is in an amorphous state immediately after film formation. To initialize the recording film 605, a laser beam is focused and incident upon the recording film 605 to crystallize the recording film 605. The first substrate 509 is produced in this way.

Figure 9:
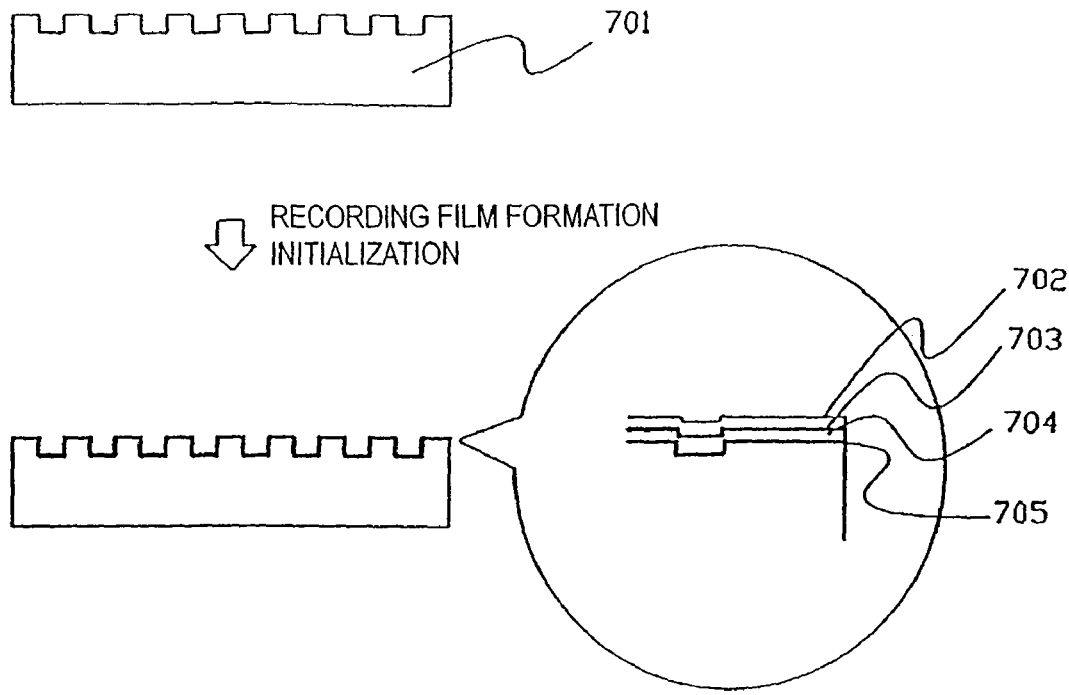
FIG. 9 is a process sectional view illustrating a second replicating step according to the first embodiment.

Then, a second substrate 510 will be produced using the above-described second stamper 508. This step (second replicating step) will be explained with reference to FIG. 9.

First, a polycarbonate substrate master 701 of approximately 1.1 mm in thickness will be produced by injection molding using the second stamper 508. A concavo-convex pattern of the second stamper 508 is transferred to the surface of the substrate master 701.

On the pattern transferred surface of the substrate master 701, a metal reflecting film 705, a second dielectric film 704, a recording film 703 and a first dielectric film 702 are stacked in that order. These multilayers (information recording films) are preferably formed using a sputtering method.

The metal reflecting film 705 is made of a metal film predominantly composed of aluminum and the first dielectric film 702 and the second dielectric film 704 are formed of a film predominantly composed of ZnS. The recording film 703 is formed of a phase change recording material mainly composed of GeTeSb. All these layers constituting the multilayer (information recording film) are preferably deposited using the sputtering method.

As in the case with the first substrate, a laser beam is condensed and irradiated onto the recording film 703 to crystallize and initialize the recording film 703. The second substrate 510 is produced in this way.

FIG. 7 will be referenced again.

UV cure resin is discharged concentrically onto the surface on which the information storage layer of the first substrate 509 is formed. Then, the substrate with the first information storage layer is laid on the substrate 510 with the second information storage layer in such a way that the surface on which the information storage layer of the substrate 510 is formed faces the substrate with the first information storage layer. By rotating these substrates and shaking off the extra UV cure resin by a centrifugal force, the thickness of the UV cure resin is adjusted to approximately 20 to 40 μm.

By hardening the UV cure resin by irradiation with ultraviolet rays, both substrates are bonded together and an intermediate layer for separating both information storage layers is formed. The multilayer optical disk 511 having two information storage layers is formed in this way.

By the way, the figure shows that the position of the track groove of the upper information storage layer perfectly aligns with the position of the track groove of the lower information storage layer, but this is not required in practice. Since tracking control is performed for each information storage layer, the positions of track grooves need not have a specific relationship with each other among different information storage layers.

Figure 1:
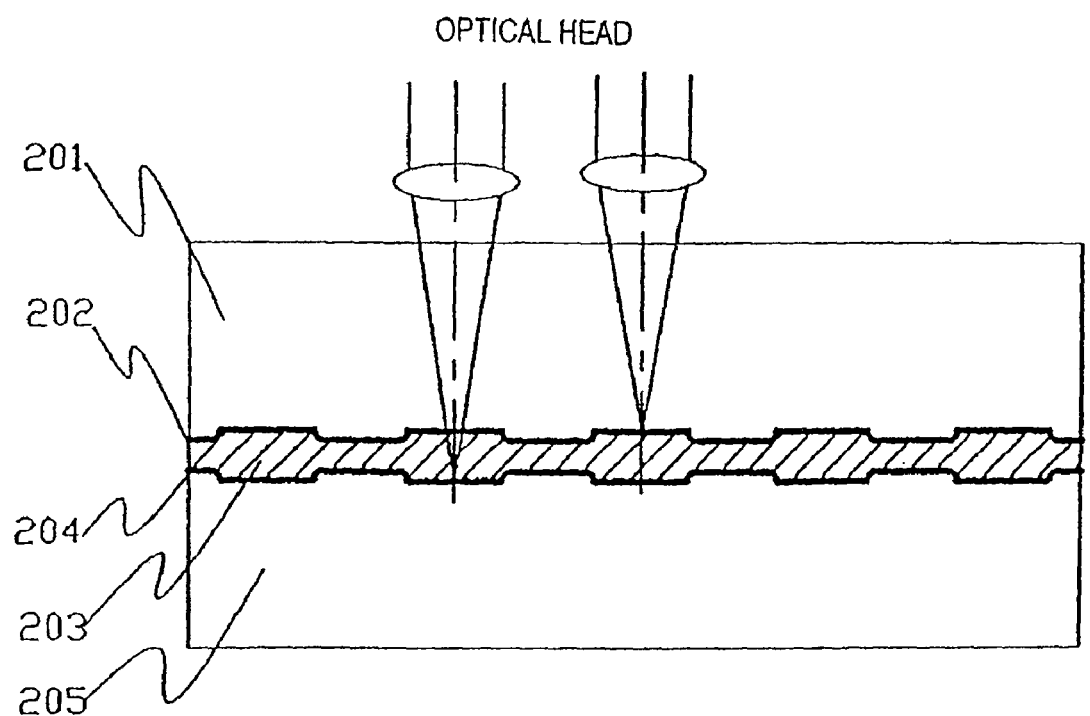
FIG. 1 is a schematic view illustrating a structure of a conventional optical disk.

This embodiment requires that the amplitude of wobbling of a track groove should differ from one information storage layer to another. Thus, the amount of deflection of the laser beam is differentiated between the step of recording a track groove pattern on the photoresist on the first master disk 505 and the step of recording a track groove pattern on the photoresist on the second master disk 506. More specifically, the amount of deflection of the laser beam is adjusted for the first master disk 505 so that the amplitude of wobbling shown in FIG. 6 becomes W1. In contrast, the amount of deflection of the laser beam is adjusted for the second master disk 506 so that the amplitude of wobbling shown in FIG. 1 becomes W2 (≠W1). This gives the first substrate 509 with the amplitude of wobbling of the track groove adjusted to W1 and the second substrate 510 with the amplitude of wobbling of the track groove adjusted to W2.

Embodiment 2

Figure 10:
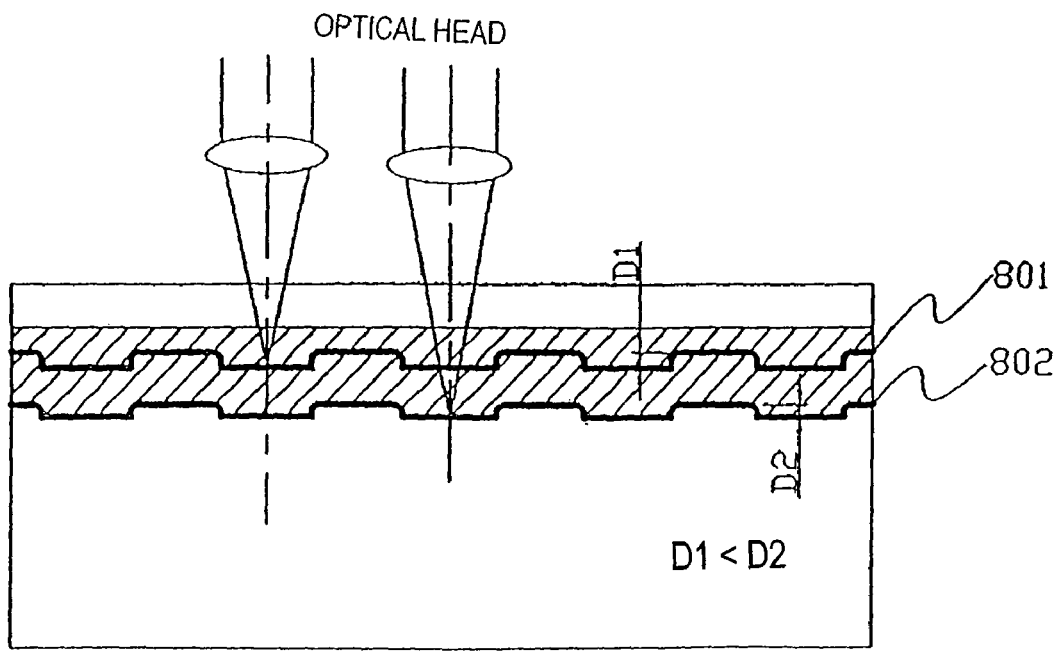
FIG. 10 is a cross-sectional view showing a structure of a second embodiment of a multilayer optical disk according to the present invention.

With reference to FIG. 10, a second embodiment of the multilayer optical disk according to the present invention will be explained.

The multilayer structure of the multilayer optical disk according to this embodiment is substantially identical to that of the multilayer optical disk according to the first embodiment. However, in the case of the optical disk of this embodiment, the depth D1 of a track groove of a first information storage layer 801 is different from the depth D2 of a track groove of a second information storage layer 802.

Figure 11:
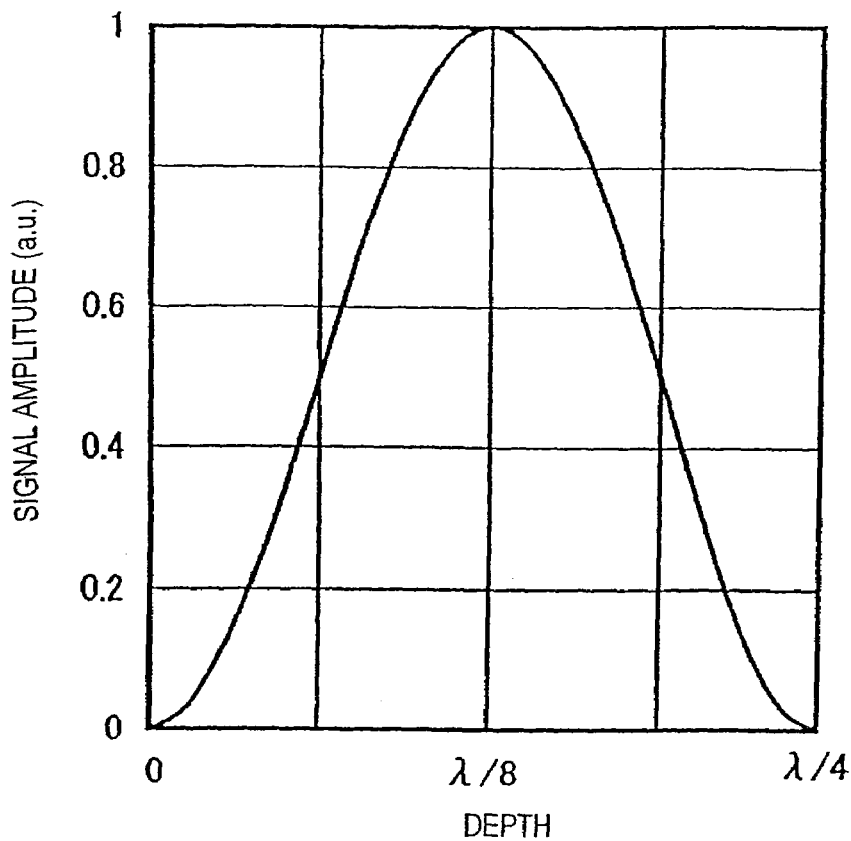
FIG. 11 is a graph illustrating a relationship between a depth of a track groove and a signal amplitude.

FIG. 11 is a graph showing a relationship between the amplitude of a readout signal and the depth of the track groove originated from the wobbling of the track groove assuming that the wavelength of a laser beam emitted from the optical head is λ. The depth of the track groove is converted to an optical path length. As is apparent from the graph in FIG. 11, the amplitude of the readout signal reaches a maximum when the depth of the track groove is λ/8 and the amplitude of the readout signal decreases as the depth approximates to λ/4. The depth D1 of the track groove of the first information storage layer and the depth D2 of the track groove of the second information storage layer are preferably set to λ/8 or less.

In the case of a multilayer optical disk, there is a tendency that noise included in the readout signal from the second information storage layer 802 becomes greater than noise included in the readout signal from the first information storage layer 801. Assuming that the depth of the track groove D1=the depth D2 of the track groove, the ratio of intensity of the laser beam reflected by the first information storage layer 801 and detected by the photo-detection area to the intensity of the incident laser beam output from the optical head is approximately 7%, whereas the proportion of intensity of the laser beam reflected by the second information storage layer 802 and detected by the photo-detection area is approximately 5%.

A CN ratio when the optical head with a numerical aperture of 0.85 that emits a laser beam with a wavelength of 405 nm is used to perform recording/reproduction is shown in Table 2. The required CN ratio is 30 dB or greater.

TABLE 2

|  | Depth 16 nm | Depth 18 nm |
| --- | --- | --- |
| 1st information storage layer (D1) | 33 dB | — |
| 2nd information storage layer (D2) | 27 dB | 31 dB |

As is apparent from Table 2, by making the depth D2 of the track groove of the second information storage layer 802 by approximately 10 to 20% greater than the depth D1 of the track groove of the first information storage layer 801, almost the same CN ratio of 30 dB or more was obtained for both information storage layers. When the amount of light reflected by the information storage layer and detected by the photo-detection area of the optical head varies considerably depending on the information storage layer, a problem occurs when the focus of the optical head is moved between the two information storage layers when recording/reproduction is performed on different information storage layers. To avoid this problem, it is preferable to adjust the amount of light corresponding to the information storage layer whose amount of light detected becomes a maximum to not more than two times the amount of light corresponding to the information storage layer whose amount of light detected becomes a minimum.

Then, a method of producing a multilayer optical disk according to this embodiment will be explained. This method of producing a multilayer optical disk is substantially the same as the method of producing a multilayer optical disk according to the first embodiment. This embodiment is different in that the thicknesses of photoresists formed on the first master disk and second master disk are set to D1 and D2 ($\neq$D1), respectively.

By the way, it is also possible to change the depth of the track groove for each information storage layer by making the thickness of the photoresist applied to the respective master disks greater than the depth of a desired track groove and changing the intensity of the laser beam in the exposure step between the two master disks.

Embodiment 3

Figure 12:
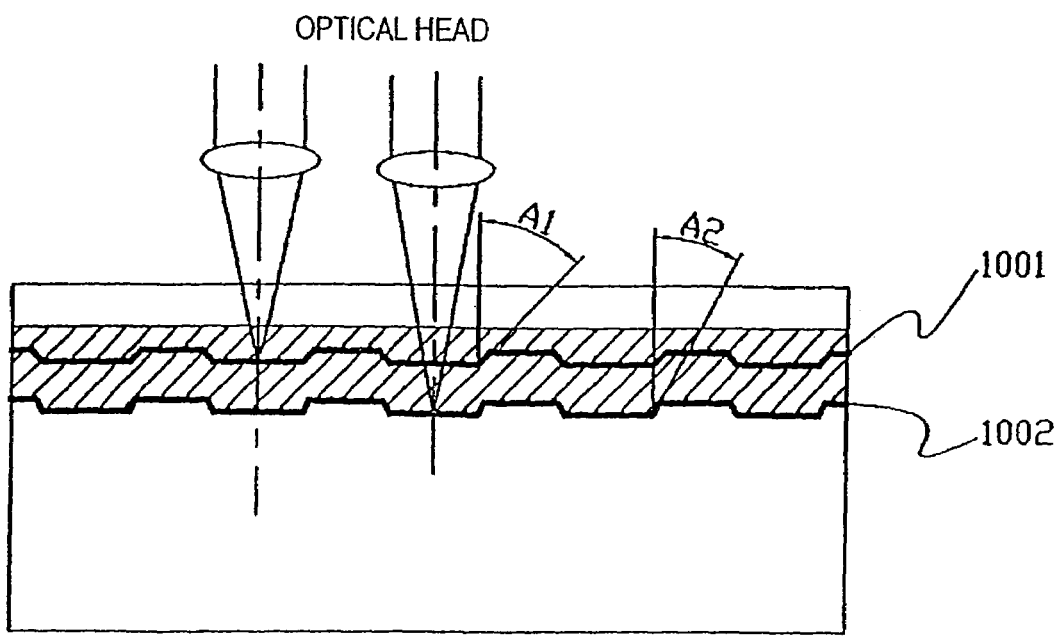
FIG. 12 is a cross-sectional view showing a structure of a third embodiment of a multilayer optical disk according to the present invention.

With reference to FIG. 12, a third embodiment of the multilayer optical disk according to the present invention will be explained.

The multilayer structure of the multilayer optical disk according to this embodiment is substantially the same as that of the multilayer optical disk according to the first embodiment. However, in the case of the optical disk of this embodiment, an angle A1 of the side wall of the track groove of a first information storage layer 1001 is different from an angle A2 of the side wall of the track groove of a second information storage layer 1002.

The signal of the track groove detected at the optical head is obtained when the reflected light of the track groove interferes with the light refracted by the track groove on the photo-detection area of the optical head. When the angle of the side wall of the track groove increases, this interference state changes, consequently having the effect equivalent to the effect produced from the shallower track groove.

Assuming that the angle A1 of the side wall of the track groove=the angle A1 of the side wall of the track groove, the proportion of intensity of the light reflected by the first information storage layer 1001 and detected by the photo-detection area to the intensity of the light incident from the optical head was approximately 7%, whereas the proportion of intensity of the light reflected by the second information storage layer 1002 and detected by the photo-detection area was approximately 5%.

Assuming that the depth of the track groove in the respective information storage layers is 17 nm, a CN ratio when the optical head with a numerical aperture of 0.85 that emits a laser beam with a wavelength of 405 nm is used to perform recording/reproduction is shown in Table 3. The required CN ratio is 30 dB or greater.

TABLE 3

|  | Angle 45° | Angle 60° |
| --- | --- | --- |
| 1st information storage layer (A1) | 38 dB | 33 dB |
| 2nd information storage layer (A2) | 33 dB | — |

As is apparent from Table 3, by making the slope angle A1 of the side wall of the track groove of the first information storage layer 1001 by approximately 15 degrees greater than the slope angle A2 of the side wall of the track groove of the second information storage layer 1002, it was possible to obtain almost the same CN ratio (33 dB) as that of the readout signal from the second information storage layer 1002. Thus, almost the same CN ratio of 30 dB or more was obtained for the readout signals from both information storage layers.

When the amount of light reflected by the information storage layer and detected by the photo-detection area of the optical head varies considerably depending on the information storage layer, a problem occurs when the focus of the optical head is moved between the two information storage layers when recording/reproduction is performed on different information storage layers. To avoid this problem, it is preferable to adjust the amount of light corresponding to the information storage layer whose amount of light detected becomes a maximum to not more than two times the amount of light corresponding to the information storage layer whose amount of light detected becomes a minimum.

Then, a method of producing a multilayer optical disk according to this embodiment will be explained. This method of producing a multilayer optical disk is substantially the same as the method of producing a multilayer optical disk according to the first embodiment. However, this embodiment heats the master disk at a temperature close to the melting point of the photosensitive material (e.g., approximately 120° C.) for several minutes between the step of exposure and development and the step of plating on the photoresist. In this heating step, the surface of the photoresist is soften and the surface region of the photoresist is rounded by surface tension. Adjusting this temperature of heating processing and/or time of heating processing allows the angle of the side wall of the track groove of the master disk to be controlled.

Even after producing the stamper, exposing the stamper to the plasma of an Ar gas allows the angle of the side wall of the track groove to be changed. This is because the plasma processing allows an electric field to concentrate on the corners of the track groove and allows the corners to be sputtered ahead of other parts and rounded. The variation in the shape of the corners through this processing depends on the time of plasma processing and state of plasma (ion density and ion irradiation energy). Thus, changing the time of plasma processing and power applied used for plasma generation from one stamper to another also makes it possible to produce a multilayer optical disk according to this embodiment. Furthermore, it is also possible to generate plasma using another gas (e.g., oxygen gas) instead of the above-described Ar gas or in addition to the Ar gas.

In the aforementioned embodiments, shape parameters such as the amplitude of wobbling of the track groove, the depth and the side wall angle of the track groove are adjusted so as to reduce noise of the second information storage layer. However, noise of the first information storage layer may also increase depending on the structure or method of producing a multilayer optical disk. In such a case, it is also possible to adjust the shape parameters of the track groove so as to reduce noise of the first information storage layer. Moreover, it is possible not only to wobble both sides of the track groove but also to wobble each side independently or wobble only one side.

Embodiment 4

Figure 13:
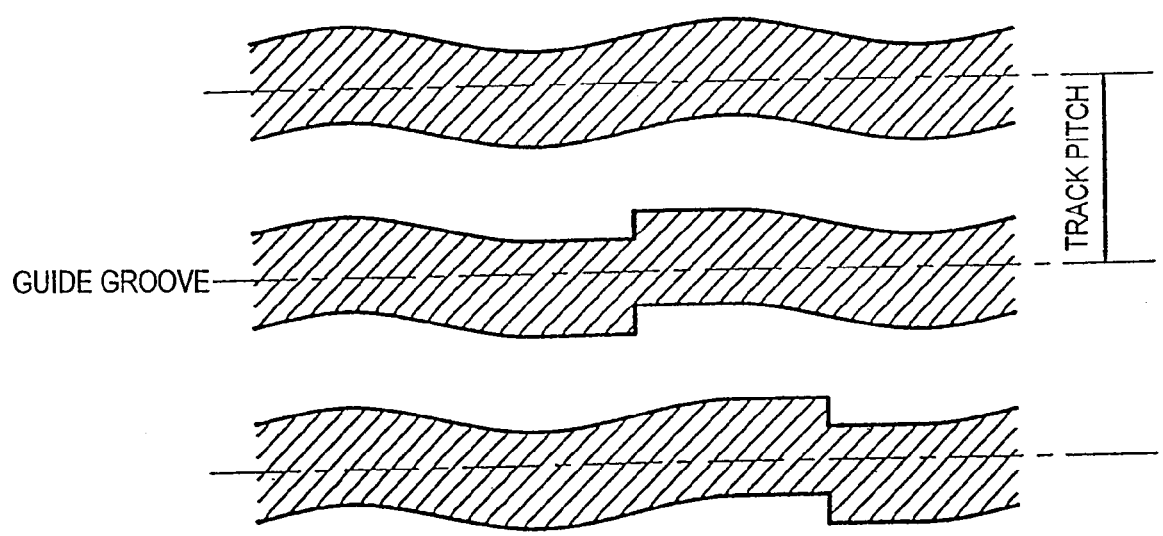
FIG. 13 is a plan view showing another example of track grooves.

The wobbling of a track groove need not be constructed of sine waveforms alone. Part of the wobbling can also be changed to a rectangular waveform as shown in FIG. 13. Giving features distinguished from a sine waveform to the track groove allows information other than clock information (sub-information such as address information) to be recorded in the track groove. Making the amount of amplitude of the rectangular waveform greater than the amount of amplitude of the sine waveform allows the sub-information to be detected with high quality.

In order to give the shapes as shown in FIG. 13 to the track groove, it is possible to expose the above-described photoresist to light using a deflector (e.g., deflector using electro-optical effects) that allows a laser beam to be deflected in a frequency band not smaller than 10 times a sine waveform frequency.

Hereunder, the optical disk specified by a combination of displacement patterns of a plurality of types of track groove wobbling structure will be explained in detail with reference to the drawings.

The surface shape of the track groove according to this embodiment not only comprises simple sine waveforms as shown in FIG. 3 or FIG. 5 alone, but also has a portion in the shape different from a sine waveform at least partially. The basic configuration of such a wobbled groove is disclosed in the Specifications of the patent applications filed by the present applicant (Japanese Patent Application No. 2000-6593, Japanese Patent Application No. 2000-187259 and Japanese Patent Application No. 2000-319009).

Figure 14:
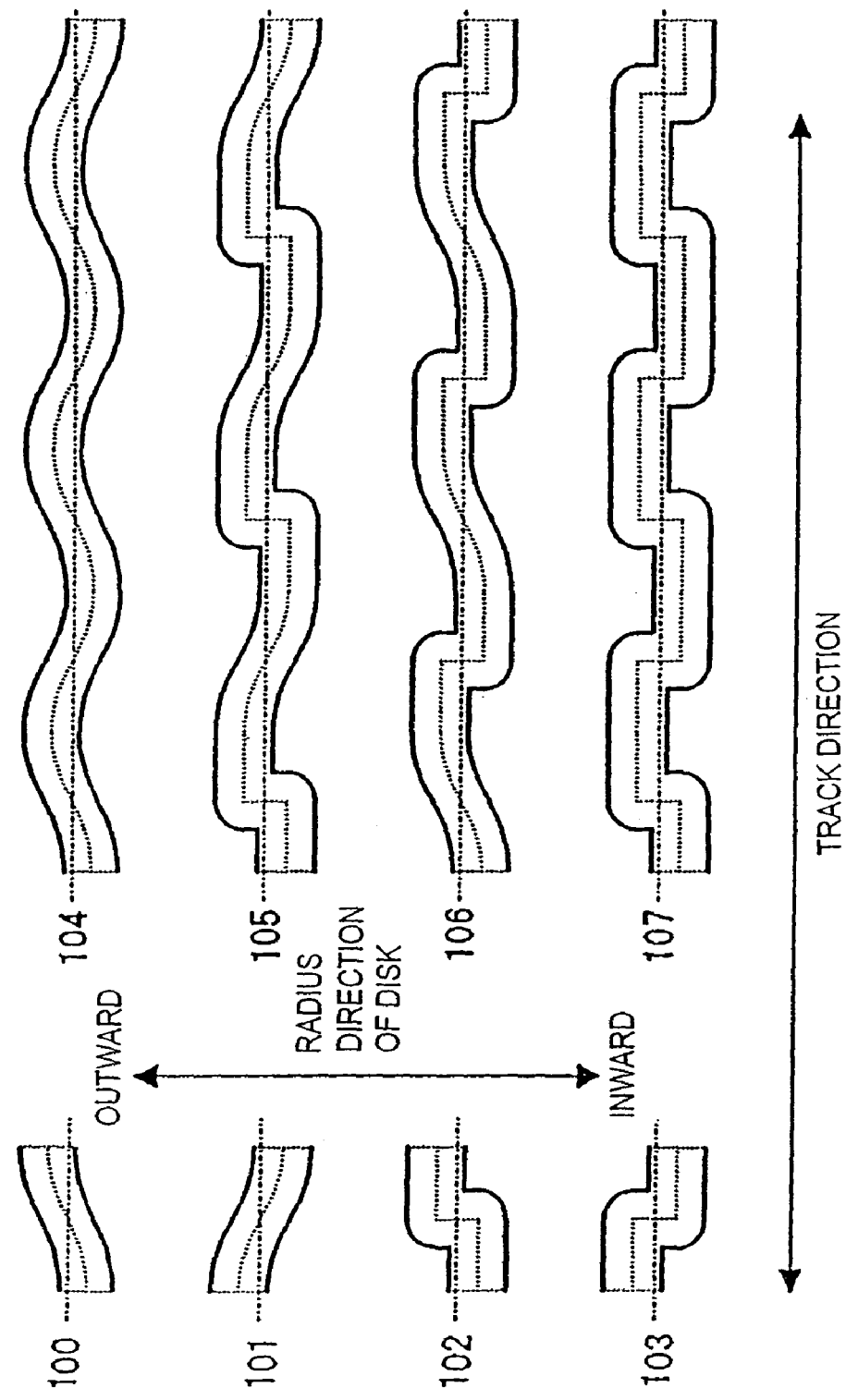
FIG. 14($a$) is a plan view showing wobble pattern elements.

Here, FIG. 14(a) and FIG. 14(b) will be referenced. FIG. 14(a) illustrates the four types of basic elements that make up a wobble pattern of the track groove 2. In FIG. 14(a), smooth sine waveform portions 100 and 101, a rectangular portion 102 with a steep radially-outward displacement and a rectangular portion 103 with a steep radially-inward displacement are shown. By combining these elements or portions with each other, the four types of wobble patterns 104 through 107 shown in FIG. 14(b) are formed.

The wobble pattern 104 is a sine wave with no rectangular portions. This pattern will be herein referred to as a "fundamental waveform". It should be noted that the "sine wave" is not herein limited to a perfect sine curve, but may broadly refer to any smooth wobble.

The wobble pattern 105 includes portions that are displaced toward the disk outer periphery more steeply than the sine waveform displacement. Such portions will be herein referred to as "radially-outward displaced rectangular portions".

In an actual optical disk, it is difficult to realize the displacement of a track groove in the disk radial direction vertically to the tracking direction. Accordingly, an edge actually formed is not perfectly rectangular. Thus, in an actual optical disk, an edge of a rectangular portion may be displaced relatively steeply compared to a sine waveform portion and does not have to be perfectly rectangular. As can also be seen from FIG. 14(b), at a sine waveform portion, a displacement from the innermost periphery toward the outermost periphery is completed in a half wobble period. As for a rectangular portion, a similar displacement may be finished in a quarter or less of one wobble period, for example. Then, the difference between these shapes is easily distinguishable.

It should be noted that the wobble pattern 106 is characterized by radially-inward displaced rectangles while the wobble pattern 107 is characterized by both "radially-inward displaced rectangles" and "radially-outward displaced rectangles".

The wobble pattern 104 consists of the fundamental waveform alone. Accordingly, the frequency components thereof are defined by a "fundamental frequency" that is proportional to the inverse number of the wobble period T. In contrast, the frequency components of the other wobble patterns 105 through 107 include not only the fundamental frequency components but also high-frequency components. Those high-frequency components are generated by the steep displacements at the rectangular portions of the wobble patterns.

If the coordinate system shown in FIG. 3 is adopted for each of these wobble patterns 105 through 107 to represent the Y coordinate of a position on the track centerline by a function of the X coordinate thereof, then the function may be expanded into Fourier series. The expanded Fourier series will include a term of a sin function having an oscillation period shorter than that of sin ($2\pi x/T$), i.e., a harmonic component. However, each of these wobble patterns includes a fundamental wave component. The frequency of the fundamental waveform will be herein referred to as a "wobble frequency". The four types of wobble patterns described above have a common wobble frequency.

In the present invention, instead of writing address information on the track groove 2 by modulating the wobble frequency, the multiple types of wobble patterns are combined with each other, thereby recording various types of information, including the address information, on the track groove. More specifically, by allocating one of the four types of wobble patterns 104 through 107 to each predetermined section of the track groove, four types of codes (e.g., "B", "S", "0" and "1", where "B" denotes block information, "S" denotes synchronization information and a combination of zeros and ones represents an address number or an error detection code thereof) may be recorded.

Next, the fundamentals of an inventive method for reading information, which has been recorded by the wobble of the track groove, from the optical disk will be described with reference to FIGS. 15 and 16.

Figure 15:
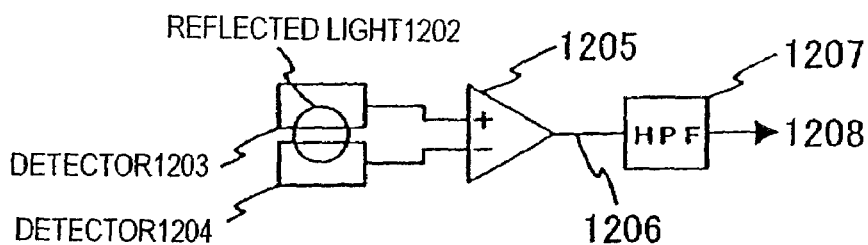
FIG. 15 illustrates a basic configuration of an apparatus capable of identifying the type of a wobble pattern based on a wobble signal whose amplitude changes according to the wobbling of a track groove.
Figure 16:
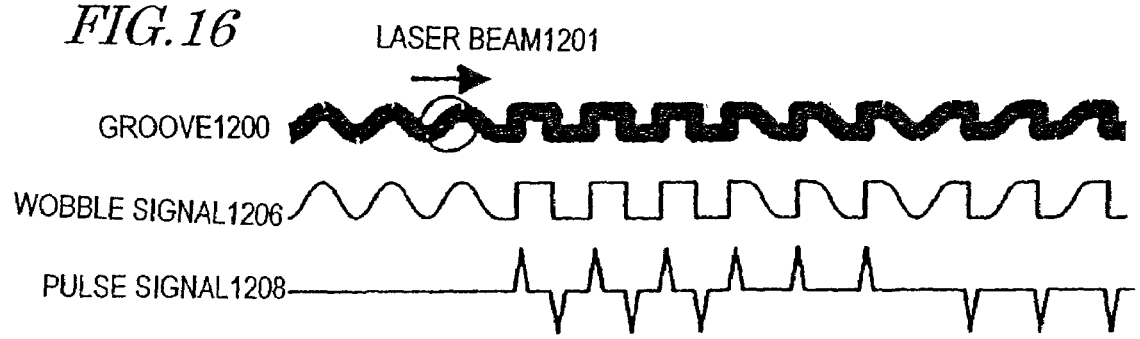
FIG. 16 is a waveform diagram showing a wobble pattern, wobble signal and pulse signal of a track groove.

First, FIGS. 15 and 16 will be referred to.

FIG. 15 illustrates a main portion of a reproducing apparatus, while FIG. 16 illustrates a relationship between the track groove and a read signal.

The track groove 1200 schematically illustrated in FIG. 16 is scanned by a read laser beam 1201 so that the spot thereof moves in the arrowed direction. The laser beam 1201 is reflected from the optical disk to form reflected light 1202, which is received at detectors 1203 and 1204 of the reproducing apparatus shown in FIG. 15. The detectors 1203 and 1204 are spaced apart from each other in a direction corresponding to the disk radial direction and each output a voltage corresponding to the intensity of the light received. If the position at which the detectors 1203 and 1204 are irradiated with the reflected light 1202 (i.e., the position at which the light is received) shifts toward one of the detectors 1203 and 1204 with respect to the centerline that separates the detectors 1203 and 1204 from each other, then a difference is created between the outputs of the detectors 1203 and 1204 (which is "differential push-pull detection"). The outputs of the detectors 1203 and 1204 are input to a differential circuit 1205, where a subtraction is carried out on them. As a result, a signal corresponding to the wobble shape of the groove 1200 (i.e., a wobble signal 1206) is obtained. The wobble signal 1206 is input to, and differentiated by, a high-pass filter (HPF) 1207. As a result, the smooth fundamental components that have been included in the wobble signal 1206 are attenuated and instead a pulse signal 1208, including pulse components corresponding to rectangular portions with steeps gradients, is obtained. As can be seen from FIG. 16, the polarity of each pulse in the pulse signal 1208 depends on the direction of its associated steep displacement of the groove 1200. Accordingly, the wobble pattern of the groove 1200 is identifiable by the pulse signal 1208.

Figure 17:
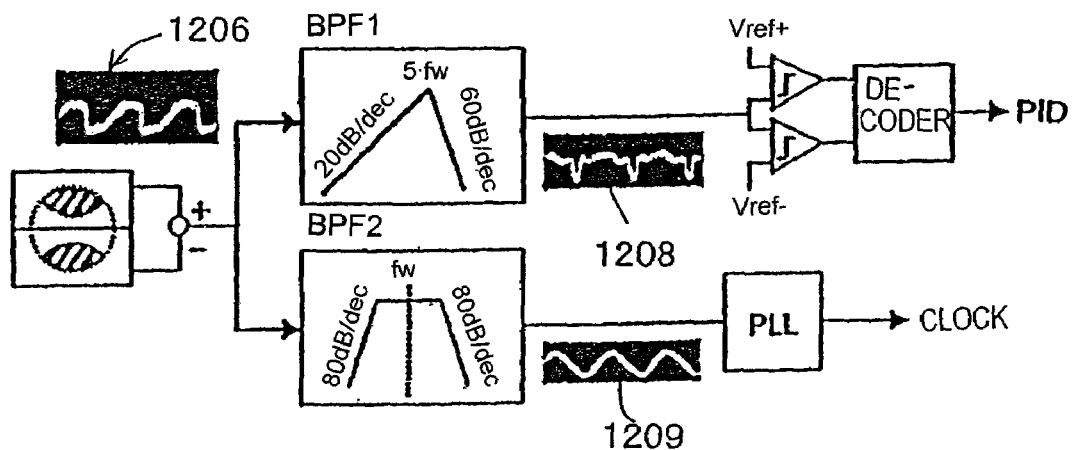
FIG. 17 illustrates a circuit configuration that separates a pulse signal and clock signal from a wobble signal.

Next, referring to FIG. 17, illustrated is an exemplary circuit configuration for generating the pulse signal 1208 and a clock signal 1209 from the wobble signal 1206 shown in FIG. 16.

In the exemplary configuration illustrated in FIG. 17, the wobble signal 1206 is input to first and second band-pass filters BPF1 and BPF2, which generate the pulse and clock signals 1208 and 1209, respectively.

Supposing the wobble frequency of the track is fw (Hz), the first band-pass filter BPF1 may be a filter having such a characteristic that the gain (i.e., transmittance) thereof reaches its peak at a frequency of 4 fw to 6 fw (e.g., 5 fw). In a filter like this, the gain thereof preferably increases at a rate of 20 dB/dec, for example, in a range from low frequencies to the peak frequency, and then decreases steeply (e.g., at a rate of 60 dB/dec) in a frequency band exceeding the peak frequency. In this manner, the first band-pass filter BPF1 can appropriately generate the pulse signal 1208, representing the rectangularly changing portions of the track wobble, from the wobble signal 1206.

On the other hand, the second band-pass filter BPF2 has such a filtering characteristic that the gain thereof is high in a predetermined frequency band (e.g., in a band ranging from 0.5 fw to 1.5 fw and including the wobble frequency fw at the center) but is small at the other frequencies. The second band-pass filter BPF2 like this can generate a sine wave signal, having a frequency corresponding to the wobble frequency of the track, as the clock signal 1209.

The track groove in this embodiment has the aforementioned complicated wobble shape, and therefore if the CN ratio of the signal reproduced from one of the two information storage layers is reduced compared to the CN ratio of the signal reproduced from the other, neither a clock signal nor address information, etc., may be reproduced accurately.

Thus, as explained with respect to Embodiments 1 to 3, by adjusting the shape factors of the track groove layer by layer, it is possible to optimize the CN ratio of the readout signal.

The present invention is not limited to a multilayer optical disk having two information storage layers, but is also applicable to a multilayer optical disk having three or more information storage layers. Furthermore, the shape factors of the track groove are not limited to the aforementioned elements and the method of changing each shape factor for each information storage layer is not limited to the aforementioned method, either. Moreover, the combination of a plurality of shape factors explained in Embodiments 1 to 3 can also be changed for each information storage layer.

The present invention provides a type of multilayer optical disk which records information in the wobbling of track grooves, changes elements of changing the amplitude of a signal with respect to the degree of modulation of the signal according to the wobbling of the track groove, that is, the amplitude of the signal with respect to the amount of reflected light (shape factors of the track groove) for each information storage layer, and can thereby read the information recorded according to the wobbling of the track groove at a satisfactory CN ratio.

I claim:

1. A method for producing a multilayer optical disk including a plurality of information storage layers, comprising:
   a mastering step of preparing a plurality of metal dies; and
   a replicating step of producing a base plate onto which a desired pattern is transferred using said plurality of metal dies and forming recordable/reproducible information storage layers,
   wherein the plurality of information storage layers include a first information storage layer having a first track groove wobbling at a first amplitude and a second information storage layer having a second track groove wobbling at a second amplitude,
   wherein said mastering step comprising:
   a step of preparing a plurality of substrates to which a photosensitive material is applied;
   a recording step of forming a latent image of a pattern including a wobbling track groove by irradiating a selected area of said photosensitive material with recording light;
   a developing step of producing a plurality of master disks having said pattern by developing said photosensitive material; and
   a step of producing said plurality of metal dies based on said plurality of master disks, and
   in said recording step, the amount of deflection of said recording light along the radial direction of the disk is changed for each substrate and the amplitude of wobbling of said track groove is thereby changed for the first and second information storage layers.

2. The method for producing a multilayer optical disk according to claim 1, wherein said recording light is deflected according to a pattern combining a sine waveform and rectangular waveform in said recording step.

3. The method for producing a multilayer optical disk according to claim 2,
   wherein the amount of deflection of said recording light is changed between said sine waveform section and said rectangular waveform section.

4. A method for producing a multilayer optical disk including a plurality of information storage layers, comprising:
   a mastering step of preparing a plurality of metal dies; and
   a replicating step of producing a base plate onto which a desired pattern is transferred using said plurality of metal dies and forming recordable/reproducible information storage layers, and
   wherein the plurality of information storage layers include a first information storage layer having a first track groove having a first tilt angle and a second information storage layer having a second track groove having a second tilt angle,
   wherein said mastering step comprising:
   a step of preparing a plurality of substrates to which a photosensitive material is applied;

a recording step of forming a latent image of a pattern including a wobbling track groove by irradiating a selected area of said photosensitive material with recording light;

a developing step of producing a plurality of master disks having said pattern by developing said photosensitive material; and a step of producing said plurality of metal dies based on said plurality of master disks, and the tilt angle of the side wall of said track groove is changed for each of said plurality of metal dies.

5. The method for producing a multilayer optical disk according to claim 4, wherein the tilt angle of the side wall of said track groove is changed by applying heating processing to said master disk after said developing step.

6. The method for producing a multilayer optical disk according to claim 4, wherein the tilt angle of the side wall of said track groove is changed by applying plasma processing to said metal die after said mastering step and before said replicating step.

7. The method for producing a multilayer optical disk according to claim 6, wherein argon and/or oxygen is used for said plasma processing.

8. The method for producing a multilayer optical disk according to claim 4, wherein said recording light is deflected according to a pattern combining a sine waveform and rectangular waveform in said recording step.

9. The method for producing a multilayer optical disk according to claim 8, wherein the amount of deflection of said recording light is changed between said sine waveform section and said rectangular waveform section.

* * * * *